(12) United States Patent
Batton et al.

(10) Patent No.: US 8,020,337 B1
(45) Date of Patent: Sep. 20, 2011

(54) AUTOMATICALLY SETTING FISHING HOOK ASSEMBLY

(75) Inventors: Richard A. Batton, Granbury, TX (US); Jeffrey A. Dow, Dewey, OK (US)

(73) Assignee: 2Masterminds, LLC, Grandbury, TX (US)

( * ) Notice: Subject to any disclaimer, the term of this patent is extended or adjusted under 35 U.S.C. 154(b) by 0 days.

(21) Appl. No.: 12/662,446

(22) Filed: Apr. 16, 2010

(51) Int. Cl.
*A01K 83/02* (2006.01)

(52) U.S. Cl. ............................. 43/36; 43/37
(58) Field of Classification Search ........... 43/34, 35, 43/36, 37, 15
See application file for complete search history.

(56) References Cited

U.S. PATENT DOCUMENTS

| 243,622 | A | * | 6/1881 | Rentz et al. ........................ 43/36 |
| 627,015 | A | | 6/1899 | Schlaebitz |
| 814,624 | A | | 3/1906 | Robinson |
| 914,906 | A | * | 3/1909 | Willis ................................ 43/36 |
| 1,814,037 | A | | 7/1931 | Hazen |
| 2,244,980 | A | | 6/1941 | Abramson |
| 2,350,650 | A | * | 6/1944 | Titus ................................. 43/37 |
| 2,632,275 | A | * | 3/1953 | Richardson ...................... 43/37 |
| 2,643,479 | A | * | 6/1953 | Stevenson ........................ 43/36 |
| 2,644,264 | A | * | 7/1953 | Heki ................................ 43/36 |
| 2,748,521 | A | * | 6/1956 | Schaefer .......................... 43/35 |
| 2,873,548 | A | * | 2/1959 | Reeder ............................ 43/37 |
| 3,803,748 | A | * | 4/1974 | Neal ................................ 43/36 |
| 4,186,509 | A | * | 2/1980 | Maloney ........................... 43/36 |
| 4,387,528 | A | | 6/1983 | Kahl |
| 4,524,537 | A | * | 6/1985 | Malchert, Sr. ................... 43/36 |
| 4,616,439 | A | | 10/1986 | Lee |
| 4,774,784 | A | * | 10/1988 | Lee ................................. 43/36 |
| 5,491,925 | A | * | 2/1996 | Carpenter ........................ 43/37 |
| 5,890,314 | A | | 4/1999 | Peters |
| 6,497,068 | B1 | * | 12/2002 | Lemons ........................... 43/36 |
| 6,868,632 | B1 | * | 3/2005 | Heck et al. ....................... 43/37 |
| D589,587 | S | | 3/2009 | Stacy et al. |
| 2004/0134118 | A1 | * | 7/2004 | Miller et al. .................... 43/34 |
| 2004/0172874 | A1 | * | 9/2004 | Minegar .......................... 43/35 |

FOREIGN PATENT DOCUMENTS

| AU | 95-037787 | 5/1997 |
| AU | 99-018449 | 5/1999 |
| AU | 2000-048657 | 9/2000 |

* cited by examiner

*Primary Examiner* — Darren W Ark
*Assistant Examiner* — Lisa Tsang
(74) *Attorney, Agent, or Firm* — Richard C. Litman

(57) ABSTRACT

The automatically setting fishing hook assembly includes two hooks pivotally secured to a common shaft with their bends oriented opposite one another. The shanks of the hooks are offset from the shaft by short arms that pivot on the shaft. A coil spring is installed on the shaft between the hooks, with the opposite ends of the spring engaging the shanks of the hooks to urge the bends of the hooks outwardly from one another. A latch is affixed to the shank of one hook, and engages the shank of the other hook to hold the two hooks together. The latch is disengaged from the second hook when a fish strikes the assembly, with the bends of the two hooks springing apart to automatically set the two hooks in the mouth of the fish to reduce the chance of the fish slipping the hooks and escaping.

6 Claims, 3 Drawing Sheets

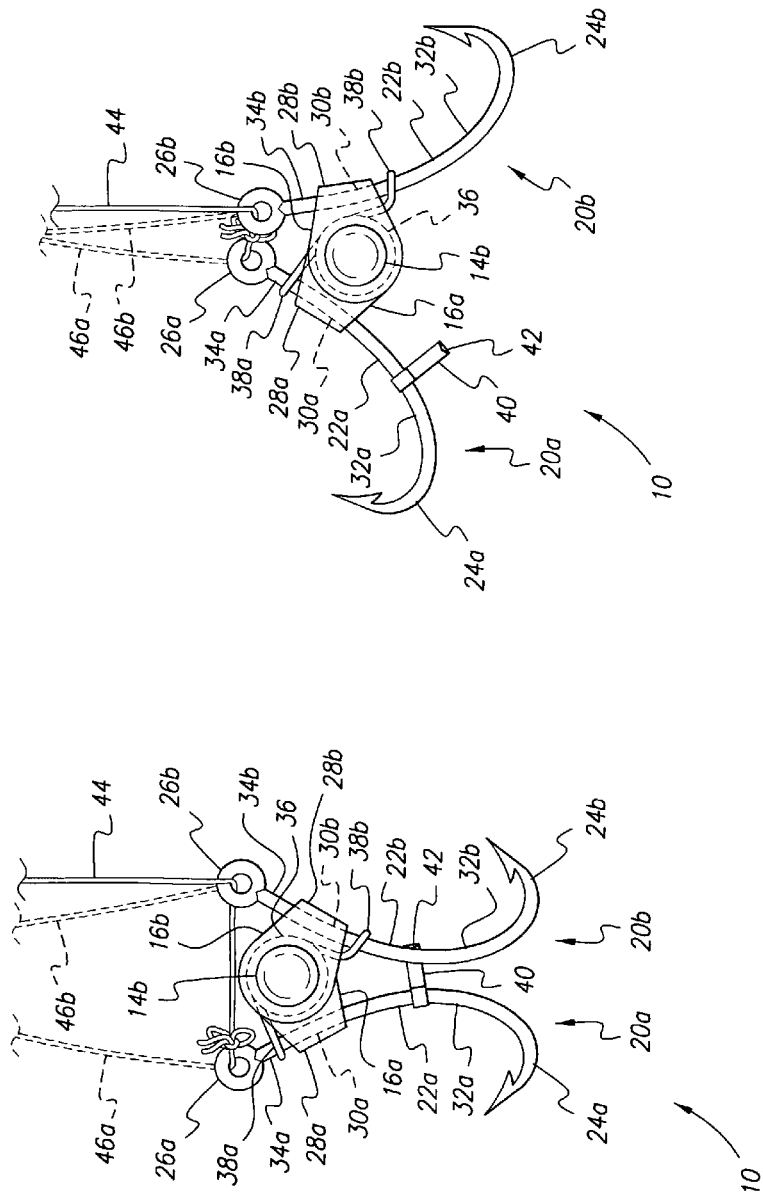

AUTOMATICALLY SETTING FISHING HOOK ASSEMBLY

BACKGROUND OF THE INVENTION

1. Field of the Invention

The present invention relates generally to fishing tackle, and more particularly to an automatically setting fishing hook assembly that has two separate hooks biased outwardly by a spring to facilitate setting the hook when a fish strikes.

2. Description of the Related Art

The experienced angler is well aware of the difficulty in setting a hook when catching a fish, and the ease with which a fish may sometimes slip the hook and escape after striking and taking the bait. It is for this reason that conventional hooks are provided with barbs, and that double and treble hooks are sometimes preferred for some types of fishing. Nevertheless, these hook improvements over the basic single, non-barbed hook still do not provide complete assurance of a successful catch after a strike.

As a result, various mechanical devices have been developed in the past to deploy multiple hooks when a fish strikes the hooks and bait. Most such devices aim to reduce the number of parts by forming the two hooks from a single length of wire, with a medial portion of the wire being coiled into a spring to urge the hooks outwardly from one another when a fish strikes and trips the device. Some others may use two separate lengths of wire to form the two hooks and a separate spring, but invariably the hook components must be manufactured with additional bends, intermediate eyes along their shanks, and/or some other non-standard configuration that complicates manufacture. Most of these automatically deploying hook assemblies also require relatively complex, multiple component mechanisms that are tripped when the fish strikes the hooks, thereby releasing the restrained hooks.

Thus, an automatically setting fishing hook assembly solving the aforementioned problems is desired.

SUMMARY OF THE INVENTION

The automatically setting fishing hook assembly includes two separate hooks that are urged apart by a separate spring acting on the shanks of both hooks. Each of the hooks is secured to a short pivot arm, with the pivot arms in turn being pivotally secured to a shaft. The hooks and arms are disposed in mirror image to one another, i.e., the bends of the two hooks are oriented opposite one another. A coil spring is positioned on the shaft between the two arms, with opposite ends of the coil bearing against the shanks of the two hooks and urging the bends of the two hooks outwardly relative to one another. A small latch or catch is immovably affixed to the shank of one of the hooks, and catches the shank of the opposite hook to hold the hooks together prior to a fish strike. When a fish strikes the hook assembly, the latch is disengaged from the second hook and the bends of the two hooks spring apart from one another due to the pressure of the coil spring. This automatically sets the two hooks in the mouth of the fish and assures that the fish cannot slip the hook and escape.

These and other features of the present invention will become readily apparent upon further review of the following specification and drawings.

BRIEF DESCRIPTION OF THE DRAWINGS

FIG. 2A is an elevation view of the automatically setting fishing hook assembly of FIG. 1, showing the hooks secured to one another prior to a fish strike.

FIG. 2B is an elevation view of the automatically setting fishing hook assembly of FIG. 1, showing the hooks spread as would occur after a fish strike.

Similar reference characters denote corresponding features consistently throughout the attached drawings.

DETAILED DESCRIPTION OF THE PREFERRED EMBODIMENTS

Figure 1A:
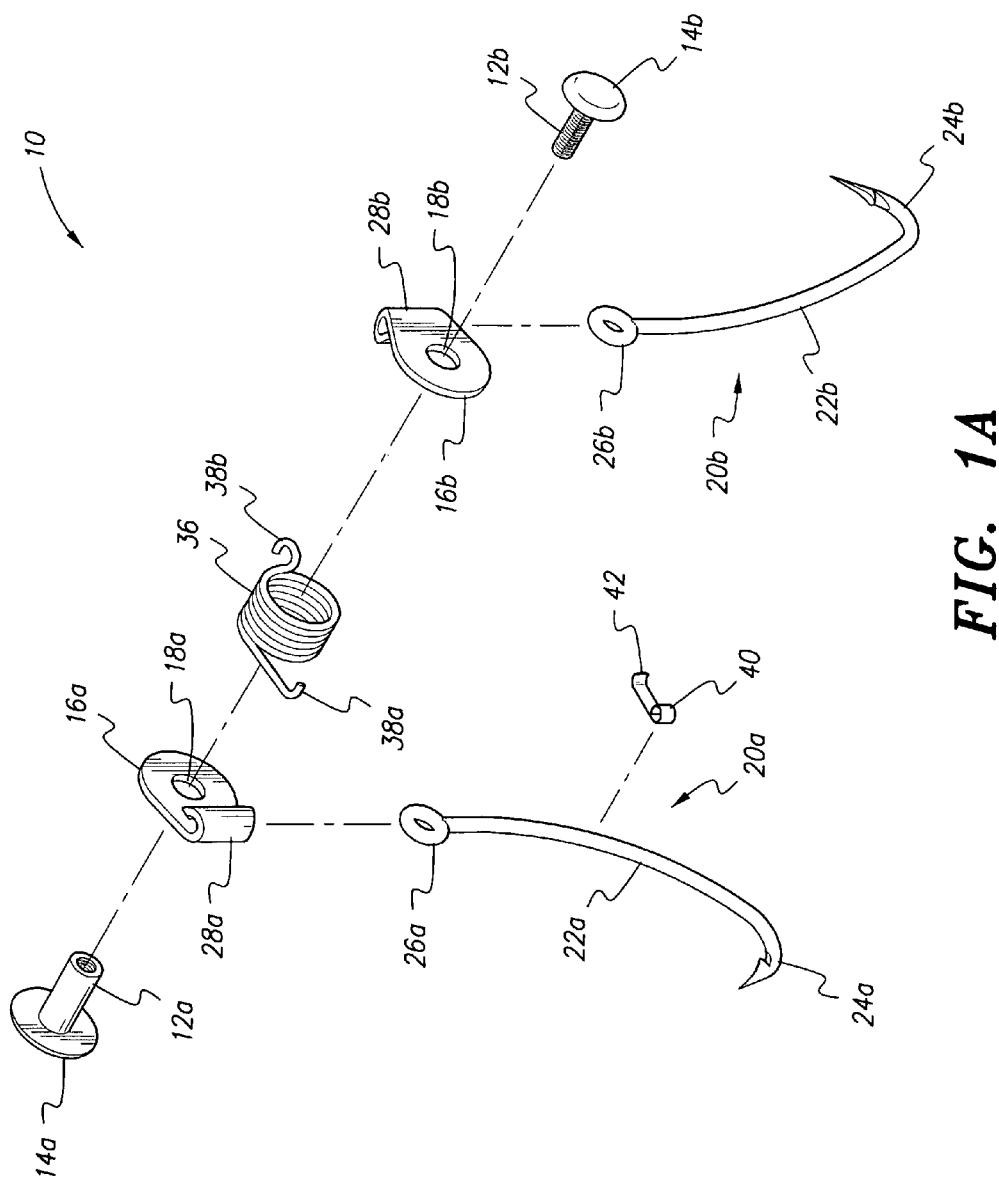
FIG. 1A is an exploded perspective view of an automatically setting fishing hook assembly according to the present invention, illustrating its various components and their relationships to one another.

FIG. 1A provides an exploded perspective view of a first embodiment of an automatically setting fishing hook assembly 10, illustrating its various components and their relationship. The assembly 10 includes a series of components that are movably or pivotally secured along a shaft. The shaft comprises an internally threaded first component 12a and an opposite second component 12b having an externally threaded shank that threads into the first component 12a. Each shaft component 12a, 12b has a relatively large diameter head, the first component 12a having a first end or head 14a and the opposite second component 12b having a second end or head 14b. The various components that are movably or pivotally secured on the shaft are captured between the two heads or ends 14a and 14b.

The shaft includes relatively short first and second arms 16a and 16b, which pivot thereon and extend radially therefrom. Each arm 16a, 16b includes a hole or passage 18a and 18b, the passages 18a, 18b fitting over the larger external diameter of the first shaft component 12a. Each arm 16a, 16b is formed of a relatively thin, flat piece of brass sheet material, or other suitable material.

The two arms 16a, 16b provide pivotal attachment for the first and second hooks 20a, 20b of the automatically setting fishing hook assembly 10. Each hook 20a, 20b includes a shank 22a and 22b, a bend 24a and 24b, and an eye 26a and 26b opposite the respective bend. In the embodiment of FIGS. 1A, 2A, and 2B, the shanks 22a, 22b of the hooks 20a, 20b are curved, but it will be seen that the shanks may be straight, as in the embodiment illustrated in FIG. 1B, discussed further below.

Each of the arms 16a, 16b has a distal end 28a and 28b that attaches to the respective hook 20a, 20b at a shaft attachment point, respectively 30a and 30b, as shown in FIGS. 2A and 2B. The sheet metal distal ends 28a, 28b of the two arms 16a, 16b are wrapped around the respective shanks 22a and 22b of the two hooks and soldered or otherwise affixed to the hook shanks 22a, 22b to secure the hooks 20a, 20b to their respective arms 16a, 16b, thus forming the shaft attachment for each hook. The two hooks 20a, 20b are thus radially offset from the shaft by the short lengths of the two arms 16a, 16b, but pivot on the shaft by means of the arms 16a and 16b.

The shaft attachment points 30a, 30b defined by the attachments of the two arms 16a, 16b to the respective hook shanks 22a, 22b divide each hook shank into a bend portion 32a and 32b and an eye portion 34a, 34b opposite the bend portion 32a, 32b. It will be seen in FIGS. 2A and 2B that the bend portion 32a, 32b of each hook shank is longer than the eye portion 34a, 34b, and that the bends 24a and 24b of the two hooks 20a and 20b are oriented in mirror image to one another on the shaft of the assembly 10.

The assembled first and second shaft components 12a and 12b include a torsion coil or helical spring 36 installed thereon between the two arms 16a and 16b and coaxial with the shaft. The spring 36 is preferably formed of corrosion-resistant steel, i.e., "stainless" steel, and has opposed first and second ends 38a and 38b, which engage the respective hook shanks 22a and 22b and urge the shanks and hook bends 24a and 24b apart from one another. The first spring end 38a hooks around the eye portion 34a of the first hook shank 22a, while the second spring end 38b wraps around the bend portion 32b of the second hook shank 22b. The coil spring 36 is installed on the shaft with some pre-wind to the coil, i.e., the two ends 38a and 38b exert an unwinding force with the second end 38b producing a counter-clockwise force relative to the first end 38a. Thus, the first spring end 38a pulls the eye portion 34a of the first hook shank 22a toward its counterpart second hook eye portion 34b, while the second spring end 38b exerts a pushing force on the bend portion 32b of the second hook shank 22b, thus applying a force to the second hook shank 22b and its bend 24b to push it away from the opposite first hook shank 22a and its bend 24a.

A latch 40 formed of a small piece of brass sheet stock or other suitable material is permanently affixed (soldered, etc.) to the bend portion 32a of the first hook 20a. The latch 40 has a distal end with a small hook or catch 42 extending therefrom that hooks around the opposite bend portion 32b of the shank of the second hook 20b when the two hook shanks 22a and 22b and their bends 24a and 24b are drawn together, as shown in FIG. 2A.

When a fish strikes the automatically setting hook assembly 10 of FIG. 2A, the strike jars the distal end hook or catch 42 of the latch 40 loose from the bend portion 32b of the second hook 20b, thereby allowing the coil spring 36 to partially unwind and pivot the two hook shanks 22a and 22b and bend portions 24a and 24b of the two hooks 20a and 20b outwardly from one another, thus automatically setting the two hooks generally as shown in FIG. 2B. Additional force spreading the two hook bends 24a and 24b apart from one another is applied by the single leader system shown in solid lines in FIGS. 2A and 2B. The single leader 44 terminates at and is secured to the eye 26a of the first hook 20a, and passes through the eye 26b of the second hook 20b. When tension is applied to the leader 44, e.g., by a fish taking the hook assembly 10, the single leader 44 draws the two hook eyes 26a and 26b together, thus applying an opposite spreading force to the two bends 24a and 24b of the hooks 20a and 20b to the opposite side of the pivot point from the two hook eyes 26a and 26b. Alternatively, two leaders 46a and 46b may be used if so desired, as indicated in broken lines in FIGS. 2A and 2B.

Figure 1B:
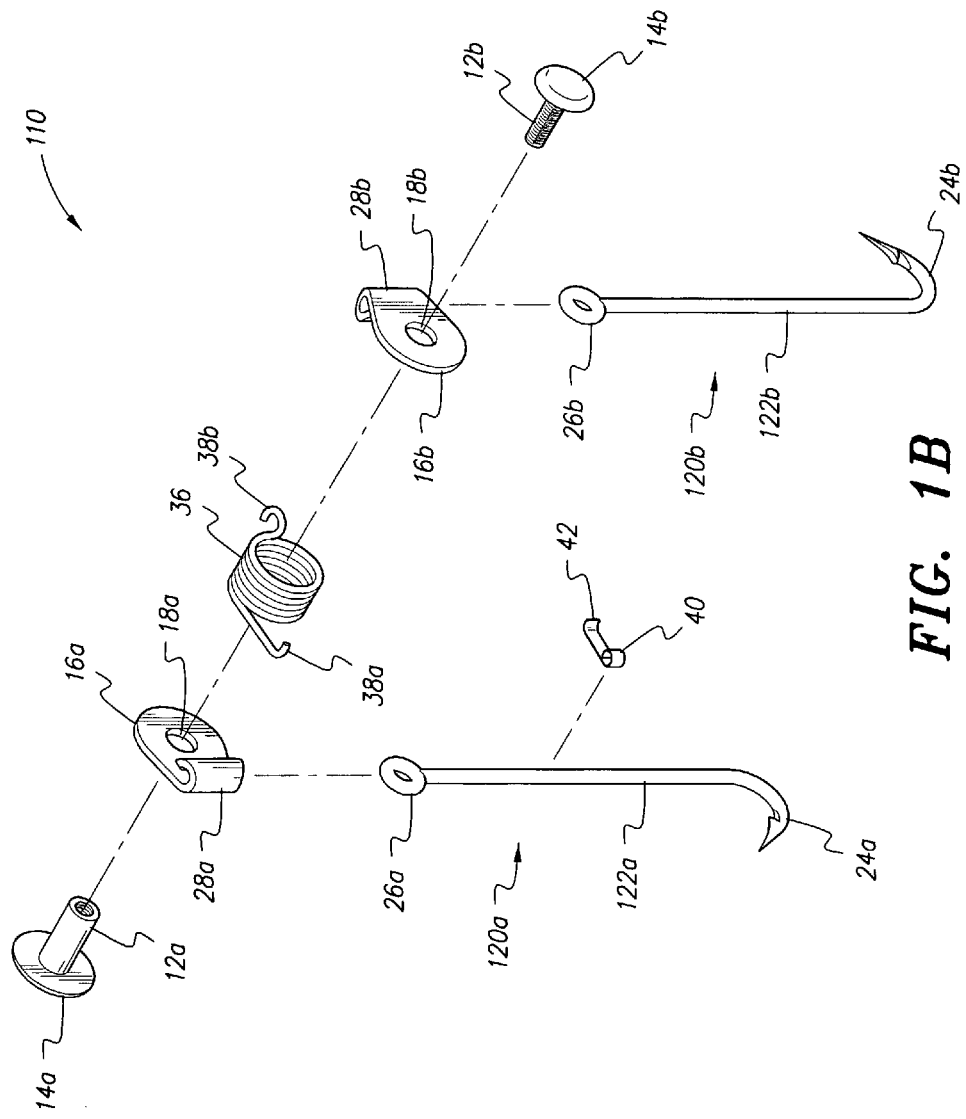
FIG. 1B is an exploded perspective view of an alternative embodiment of an automatically setting fishing hook assembly according to the present invention, wherein the hooks have straight shanks.

FIG. 1B is an illustration of an alternative embodiment of the automatically setting fishing hook assembly, designated as hook assembly 110. The fishing hook assembly 110 of FIG. 1B differs from the assembly 10 of FIGS. 1A, 2A, and 2B only in the configurations of the two hooks 120a and 120b. It will be seen in FIG. 1B that the two hooks 120a, 120b have straight shanks, respectively 122a and 122b, rather than the curved shanks 22a, 22b of the two hooks 20a and 20b of hook assembly embodiment 10. All other components are identical to corresponding components of the hook assembly 10, and are designated by like reference numerals and characters. The fishing hook assembly 110 of FIG. 1B functions essentially identically to the hook assembly 10 of FIGS. 1A, 2A, and 2B, as explained in detail further above. Regardless of the specific shapes or configurations of the shanks of the hooks used in the automatically setting fishing hook assembly 10 or 110, the device greatly facilitates setting the hook due to its fully automatic operation when a fish strikes, thus providing a greater likelihood of a catch for the angler.

It is to be understood that the present invention is not limited to the embodiments described above, but encompasses any and all embodiments within the scope of the following claims.

We claim:

1. An automatically setting fishing hook assembly, comprising:
   a shaft having a first end and a second end opposite the first end, wherein the first and second ends are configured for interconnection;
   a plurality of plates, the plates forming a first arm and a second arm pivotally disposed upon the shaft and extending radially therefrom, each of the arms having a distal end;
   a first hook and a second hook, each of the hooks having a shank and a bend, the shank of each said hook having an eye opposite the bend, the shank of each of the hooks being attached to the distal end of the respective first arm and second arm, the bend of the first hook being oriented in mirror image to the bend of the second hook, wherein the distal end of each arm is attached to the shank of the respective hook at a shaft attachment point, the shaft attachment point separating the shank into a bend portion and an eye portion opposite the bend portion;
   a coil spring disposed about the shaft between the first arm and the second arm, the spring having a first end engaging the shank of the first hook and a second end engaging the shank of the second hook, the spring urging the bend of the first hook apart from the bend of the second hook, wherein the first end of the spring engages the shank of the first hook below the eye portion and above the distal end of the first arm and the second end of the spring engages the bend portion of the shank of the second hook below the distal end of the second arm; and
   a latch affixed to and extending from the shank of the first hook, the latch having a distal end defining a catch for selectively engaging the shank of the second hook, the latch being located adjacent the hooks and spaced below the shaft attachment point, thereby securing the shank and the bend of the first hook and the shank and the bend of the second hook adjacent to one another, the shank and the bend of the second hook springing apart from the shank and the bend of the first hook when the distal end of the catch is released from the shank of the second hook.

2. The automatically setting fishing hook assembly according to claim 1, wherein the shank of each said hook is curved.

3. The automatically setting fishing hook assembly according to claim 1, wherein the shank of each said hook is straight.

4. The automatically setting fishing hook assembly according to claim 1, wherein:
   each said arm and the latch are formed of brass sheet material; and
   the spring is formed of corrosion resistant steel.

5. The automatically setting fishing hook assembly according to claim 1, wherein:
- the shank of each said hook has an eye opposite the bend;
- the distal end of each arm is attached to the shank of the respective hook at a shaft attachment point, the shaft attachment point separating the shank into a bend portion and an eye portion opposite the bend portion;
- the first end of the spring engages the eye portion of the shank of the first hook;
- the second end of the spring engages the bend portion of the shank of the second hook;
- at least one leader is attached to the eye of the first hook and to the eye of the second hook.

6. The automatically setting fishing hook assembly according to claim 5, wherein the bend portion of each said shank is longer than the eye portion of said shank.

* * * * *